UNITED STATES PATENT OFFICE.

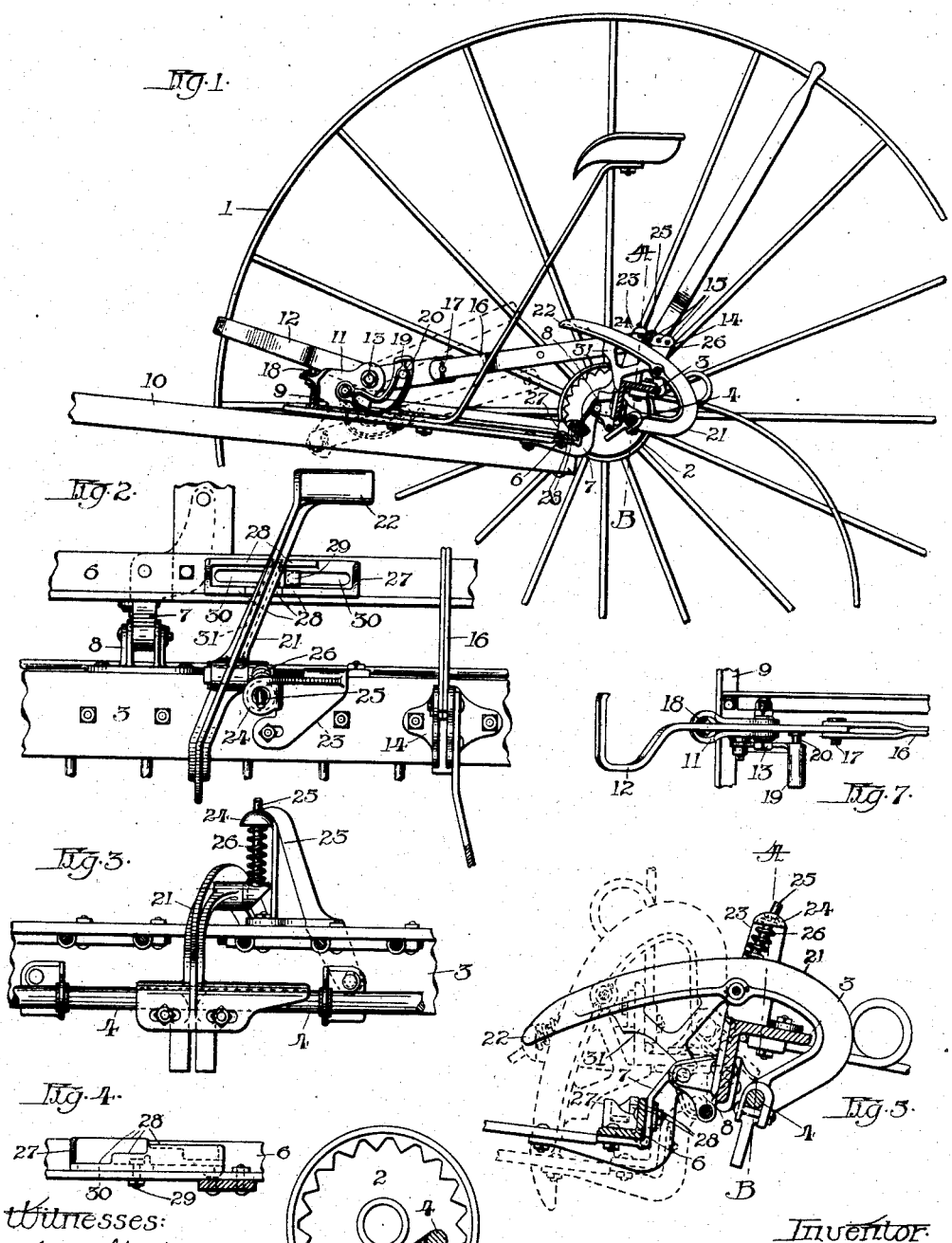

JOHN WARDEN LATIMER, OF CHICAGO, ILLINOIS, ASSIGNOR TO INTERNATIONAL HARVESTER COMPANY, A CORPORATION OF NEW JERSEY.

HAY-RAKE.

No. 907,249.　　　　Specification of Letters Patent.　　　Patented Dec. 22, 1908.

Application filed May 28, 1908. Serial No. 435,412.

*To all whom it may concern:*

Be it known that I, JOHN W. LATIMER, a citizen of the United States, residing at Chicago, county of Cook, and State of Illinois, have invented certain new and useful Improvements in Hay-Rakes, of which the following is a specification.

My invention relates to hay rakes, and particularly to the self-dump type, and has for its object improved tripping devices designed to connect the rake head with the wheel in the dumping operation of the rake; also to include means for controlling the movement of the usual toggle link connection between the draft frame and the rake head. These objects are attained by means of the mechanism illustrated in the accompanying drawing, in which—

Figure 1 is a side elevation, partly in section, showing the improved tripping mechanism, and also the toggle link controlling means; Fig. 2 is a plan view of portions of the rake head and draft frame, showing the manner in which the tripping lever is connected therewith; Fig. 3 is a rear elevation of Fig. 2; Fig. 4 represents a portion of the draft frame, having the adjustable knock-off block designed to coöperate with the tripping lever; Fig. 5 represents the operative parts of the tripping mechanism in various positions of its adjustment; Fig. 6 is an end elevation of a toothed disk that forms a part of the hub of the carrying wheels; and Fig. 7 represents a forward portion of the toggle link connection between the draft frame and the rake head.

Referring to the drawing, wherein the same reference numerals designate like parts throughout the several views, 1 represents a carrying wheel having a toothed disk 2 forming a part of the hub thereof.

3 represents a rake head adapted to rock about the axis of the carrying wheels in a common way.

4 represents a rock shaft pivotally mounted upon the rake head and having pawls 5 at opposite ends thereof adapted to engage with the toothed disk upon the hubs of the carrying wheels.

6 represents a draft frame member arranged parallel with the rake head and pivoted thereto by means of the brackets 7 secured to the draft frame and bracket members 8 secured to the rake head.

9 represents a cross frame member forming part of the draft frame, and 10 represents the thills secured to the draft frame.

11 is a bracket member secured to the cross frame member of the draft frame, and having a foot lever 12 pivotally mounted thereon intermediate its ends by means of a pivot bolt 13. 14 represents a bracket secured to the rake head and having a series of openings 15 whereby the bracket may be adjustably connected with the rear end of the toggle link 16, the forward end of which link is pivotally connected with the rear end of said foot lever by means of the pin 17.

18 represents an adjustable bolt received by the bracket member 11 and that part which the lever 12 is designed to contact in a manner to limit the upward swing of the toggle links.

Pivotally connected with the bracket 11 is an independent foot lever 19 having a cam slot, which slot is adapted to receive a laterally projecting stud 20 secured to the rear portion of the foot lever 12, the function of the independent lever being to control the movement of the toggle connection in its movement from the position shown in dotted lines in Fig. 1 to the position shown in full lines, the movement therein illustrated being that caused by the dumping operation of the rake.

It being desirable in operating the rake to provide means whereby the rake may be held in an elevated position, by means of mechanism controlled by the foot of the operator, and when the links are in the position shown in dotted lines in Fig. 1, the stud 20 has reached the lower end of the cam slot, and by means of pressure downward upon the independent lever the operator may retain the rake in an elevated position. Secured to the rock shaft 4, near its middle portion, is a foot lever 21 that extends rearward therefrom and then is curved upward and forward above the rake head, and having at its forward end a foot piece 22.

23 represents a bracket secured to the rake head adjacent to the lever 21, which bracket is provided with a laterally projecting ear portion 24, and 25 represents a link having its lower end pivotally connected with the foot lever 21, and its upper end slidably received by an opening in the ear 24.

26 represents a spring surrounding the link and operative between the ear 24 and the lever to retain the latter in different positions of adjustment, as shown in Figs. 1 and 5, wherein the axis of the connection between the link and the lever is represented as moving in a position upon one side of a line A—B passing through the opening in the ear and on the axis of the rock shaft to a position upon the opposite side of the line.

When the tripping lever is in the position shown in Fig. 1, the pawl members of the rock shaft are disengaged from the toothed disks, as shown in full lines in Fig. 6, and when it is desired to dump the rake the operator will press down upon the foot lever 22 and swing the lever forward against the action of the spring 26 until the link reaches a position parallel with the line A—B, when the action of the spring will operate to give a further forward movement to the lever as the pivotal connection of the link passes the line between the opening in the ear 24 and the axis of the rock shaft, and such movement will cause the pawls to engage with the toothed disks, as shown by dotted lines in Fig. 6, and thereby cause the rake head to rock about its axis in a well-known way to relieve the rake of its load.

27 represents a contact block secured to the draft frame 6 and having step portions 28 of varying heights. The block is adjustable longitudinally along the member 6 by means of the bolt 29 received by the slotted opening 30 through the base portion of the block. The block may also be placed in a reversed position upon the part 6.

31 represents a downwardly extending web portion forming a part of the foot lever 21, which web portion is designed to contact with the step portion 28 of the block 27 in a manner to cause the lever to rock or turn the rock shaft about its axis in a manner to release the pawls from engagement with the toothed disks.

By means of the longitudinal adjustment of the contact block, or by reversing it on the frame member, any individual step of the series may be placed in position to contact with the part 31 of the foot lever in a manner to release the pawls when the head has reached a predetermined limit of forward movement.

It will be seen that in the operation of the mechanism when it is desired to relieve the rake of its load the operator will press down upon the tripping lever 21 and the action of the spring 26 will hold the lever in that position and cause the pawls to engage with the toothed disk until said lever is moved in an opposite direction by contact with the block, as before described.

What I claim as my invention, and desire to secure by Letters Patent, is:

1. A hay rake having, in combination, carrying wheels having toothed disks connected with their hub portions, a rake head supported by said wheels and adapted to rock about the axis thereof, a rock shaft mounted upon said head and having pawls at opposite ends thereof adapted to engage with said toothed disks when said shaft is rocked in one direction, means for rocking said shaft, said means including a lever secured to said shaft and extending forward therefrom, a vertically arranged bracket secured to said head adjacent said lever and having a laterally projecting ear portion, a link having one end pivotally connected with said lever and its opposite end slidably received by an opening in said ear portion, the axis of the connection of said link and said lever being adapted to swing from side to side of a straight line passing through the opening in said ear portion and the axis of said rock shaft, and a spring surrounding said link and operative between said ear portion and said lever to yieldingly retain said lever in either position.

2. A hay rake having, in combination, carrying wheels having toothed disks connected with their hub portions, a rake head supported by said wheels and adapted to rock about the axis thereof, a draft frame pivotally connected with said head, a rock shaft mounted upon said head and having pawls at opposite ends thereof adapted to engage with said toothed disks when said shaft is rocked in one direction, means for rocking said shaft, said means including a lever secured to said shaft and curved forward therefrom, a vertically arranged bracket secured to said head adjacent said lever and having a laterally projecting ear portion, a link having one end pivotally connected with said lever and its opposite end slidably received by an opening in said ear portion, the axis of the pivotal connection of said link and lever being adapted to swing from side to side of a straight line passing through the opening in said ear portion and the axis of said rock shaft, a spring surrounding said link and operative between said ear portion and said lever to yieldingly retain said lever in either position, and a knock-off block secured to said draft frame and adapted to contact with said lever when said head is rocked to a pre-determined limit.

3. A hay rake having, in combination, carrying wheels having toothed disks connected with their hub portions, a rake head supported by said wheels and adapted to rock about the axis thereof, a draft frame pivotally connected with said head, a rock shaft mounted upon said head and having pawls at opposite ends thereof adapted to engage with said toothed disks when said shaft is rocked in one direction, means for rocking said shaft, said means including a lever secured to said shaft and curved forward therefrom, a vertically arranged bracket secured to said head adjacent said lever and having a laterally projecting ear portion, a link having one end pivotally connected with said lever and its opposite end slidably received by an opening in said ear portion, the axis of the pivotal connection of said link and lever being adapted to swing from side to side of a straight line passing through the opening in said ear portion and the axis of said rock shaft, a spring surrounding said link and operative between said ear portion and said lever to yieldingly retain said lever in either position, and an adjustable knock-off block secured to said draft frame and adapted to contact with said lever when said head is rocked to a pre-determined limit.

4. A hay rake having, in combination, carrying wheels having toothed disks connected with their hub portions, a rake head supported by said wheels and adapted to rock about the axis thereof, a draft frame pivotally connected with said head, a rock shaft mounted upon said head and having pawls at opposite ends thereof adapted to engage with said toothed disks when said shaft is rocked in one direction, means for rocking said shaft, said means including a lever secured to said shaft and curved forward therefrom, a vertically arranged bracket secured to said head adjacent said lever and having a laterally projecting ear portion, a link having one end pivotally connected with said lever and its opposite end slidably received by an opening in said ear portion, the axis of the pivotal connection of said link and lever being adapted to swing from side to side of a straight line passing through the opening in said ear portion and the axis of said rock shaft, a spring surrounding said link and operative between said ear portion and said lever to yieldingly retain said lever in either position, and a longitudinally adjustable and reversible knock-off block secured to said draft frame and adapted to contact with said lever when said head is rocked to a pre-determined limit.

5. A hay rake having, in combination, carrying wheels having toothed disks connected with their hub portions, a rake head supported by said wheels and adapted to rock about the axis thereof, a draft frame pivotally connected with said head, a rock shaft mounted upon said head and having pawls at opposite ends thereof adapted to engage with said toothed disks when said shaft is rocked in one direction, means for rocking said shaft, said means including a lever secured to said shaft and curved forward therefrom, a vertically arranged bracket secured to said head adjacent said lever and having a laterally projecting ear portion, a link having one end pivotally connected with said lever and its opposite end slidably received by an opening in said ear portion, the axis of the pivotal connection of said link and lever being adapted to swing from side to side of a straight line passing through the opening in said ear portion and the axis of said rock shaft, a spring surrounding said link and operative between said ear portion and said lever to yieldingly retain said lever in either position, and a longitudinally adjustable and reversible knock-off block having step portions arranged in varying planes, said knock-off block being secured to said draft frame and adapted to contact said lever when said head is rocked to a pre-determined limit.

6. A hay rake having, in combination, carrying wheels, a rake head supported by said wheels and adapted to rock about the axis thereof, a draft frame pivotally connected with said head, a toggle link connection between said head and said draft frame, said toggle connection including a foot lever, a laterally projecting stud forming a part of said foot lever, an independent lever pivotally mounted upon said draft frame and having cam surfaces adapted to contact with said stud in a manner to control the movement of said toggle connection.

7. A hay rake having, in combination, carrying wheels, a rake head supported by said wheels and adapted to rock about the axis thereof, a draft frame pivotally connected with said head, said draft frame including a cross frame member, a toggle link connection between said head and said cross frame member, said toggle connection including a foot lever, a laterally projecting stud forming a part of said foot lever, an independent foot lever pivotally mounted upon said cross frame member and having a cam slot, said stud being received by said cam slot in a manner to control the movement of said toggle connection.

JOHN WARDEN LATIMER.

Witnesses:
  C. F. CRUMB,
  P. H. SHEA.